United States Patent [19]

Roth

[11] Patent Number: 4,879,929

[45] Date of Patent: Nov. 14, 1989

[54] TAPPER/THREADER ASSEMBLY

[76] Inventor: Alfred C. Roth, 2388 Yost Blvd., Ann Arbor, Mich. 48104

[21] Appl. No.: 202,451

[22] Filed: Jun. 6, 1988

[51] Int. Cl.⁴ .................... B23B 13/12; B23B 25/04; B23B 31/02; B23G 1/26

[52] U.S. Cl. ........................................ 82/110; 82/148; 82/152; 82/162; 408/141; 408/142; 10/89 H; 10/107 F

[58] Field of Search .................. 82/5, 31, 34 R, 38 R; 408/132, 141, 142; 10/89 H, 89 F, 107 F, 129 WH

[56] References Cited

U.S. PATENT DOCUMENTS

| | | | |
|---|---|---|---|
| 880,529 | 3/1908 | Heynau | 408/141 |
| 915,568 | 3/1909 | Douglas | 10/89 H |
| 974,239 | 11/1910 | Dalton | 10/89 H |
| 1,432,018 | 10/1922 | Dahlstrom | 408/142 |
| 1,763,717 | 6/1930 | Morgan | 10/89 F |
| 1,936,108 | 11/1933 | Edwards | 10/89 H |
| 2,383,991 | 9/1945 | Sarossy | 10/89 H |
| 2,530,162 | 11/1950 | Frommer | 408/142 |
| 2,714,318 | 8/1955 | Norman et al. | 192/41 R |
| 3,011,185 | 12/1961 | Khachigian | 10/129 R |
| 3,179,965 | 4/1965 | Khachigian | 408/142 |
| 3,599,260 | 8/1971 | Lesh | 10/89 H |
| 4,031,584 | 6/1977 | Khachigian | 10/89 H |
| 4,090,806 | 5/1978 | Kato | 408/142 |
| 4,288,183 | 9/1981 | Kato | 408/142 |

OTHER PUBLICATIONS

"Tap & Die Guide", Lassy Tools, Inc., Plainsville, Conn., dated Nov., 1986.

*Primary Examiner*—Robert P. Olszewski
*Assistant Examiner*—William E. Terrell
*Attorney, Agent, or Firm*—Emch, Schaffer, Schaub & Porcello Co.

[57] ABSTRACT

A tapper/threader assembly for use in a lathe is disclosed. The assembly has a piston member mounted for reciprocal movement with a sleeve housing, a shank member is connected to the piston member and an end extending from the housing. A mounting shaft for a chuck extends from the housing and a spring biases the housing toward the piston member.

7 Claims, 3 Drawing Sheets

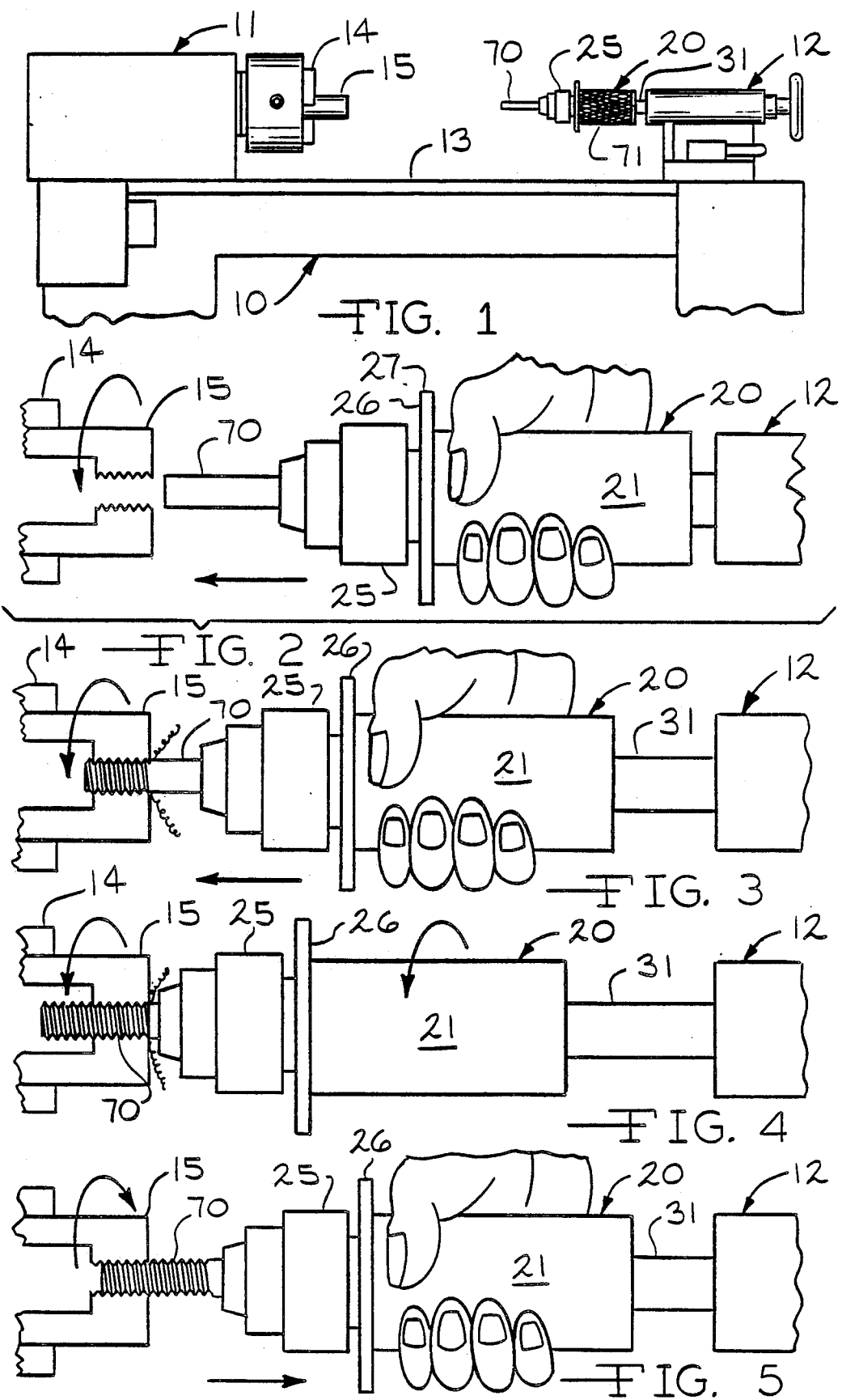

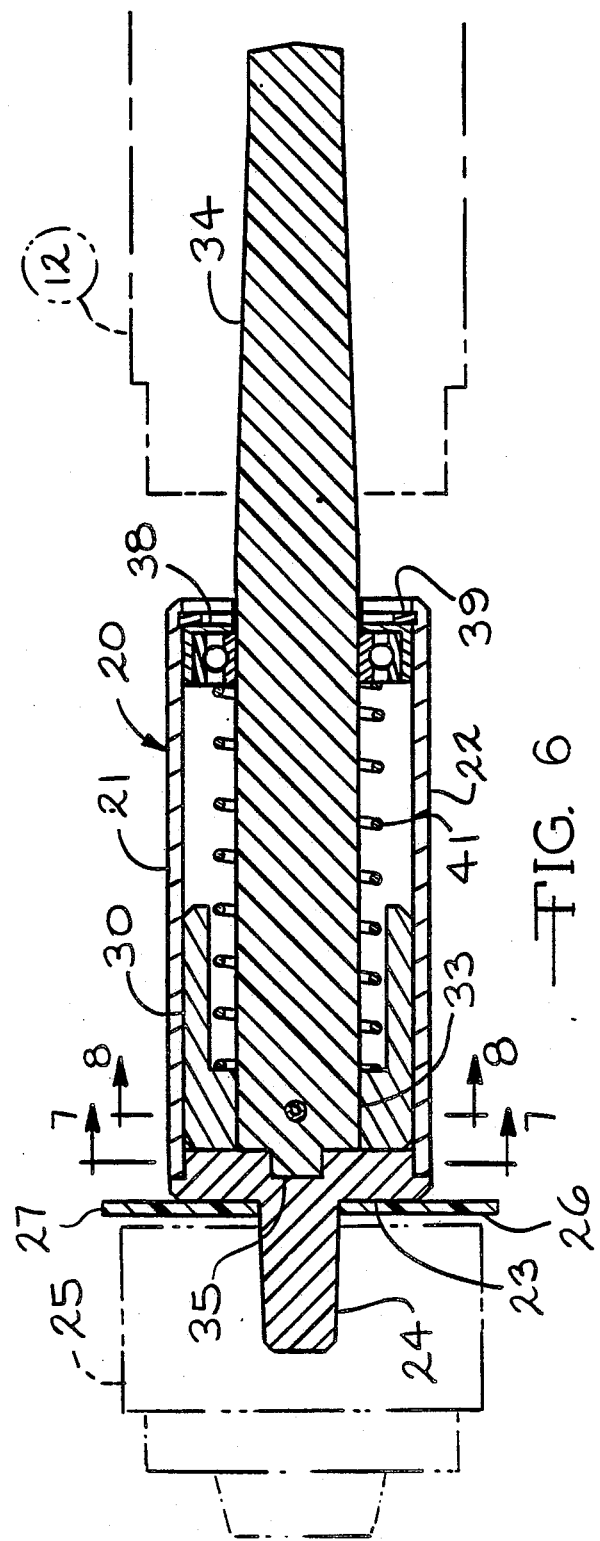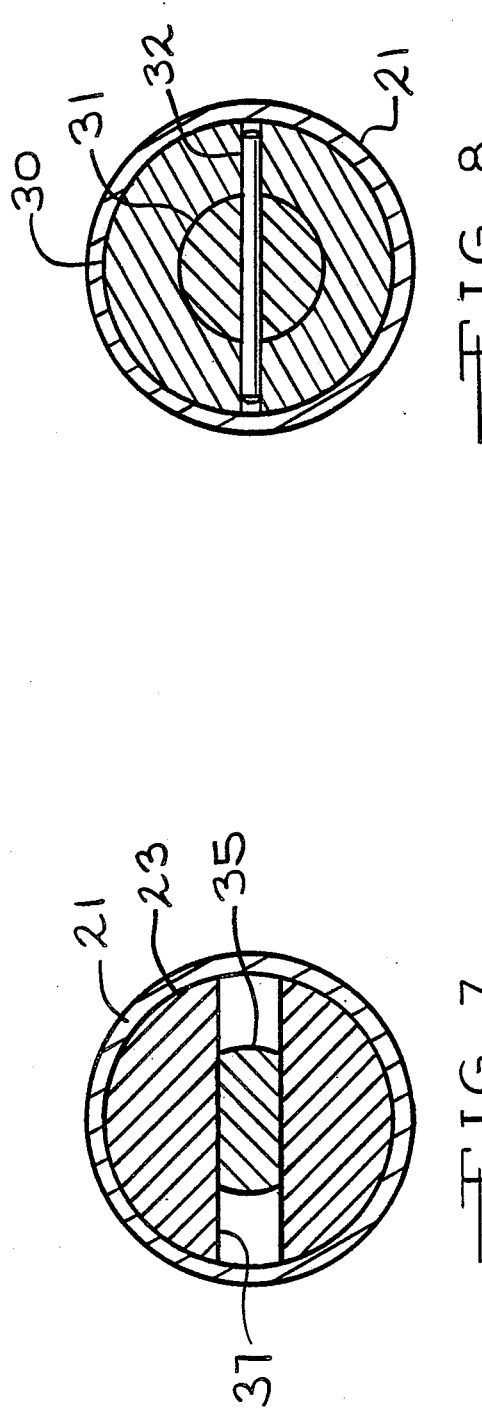

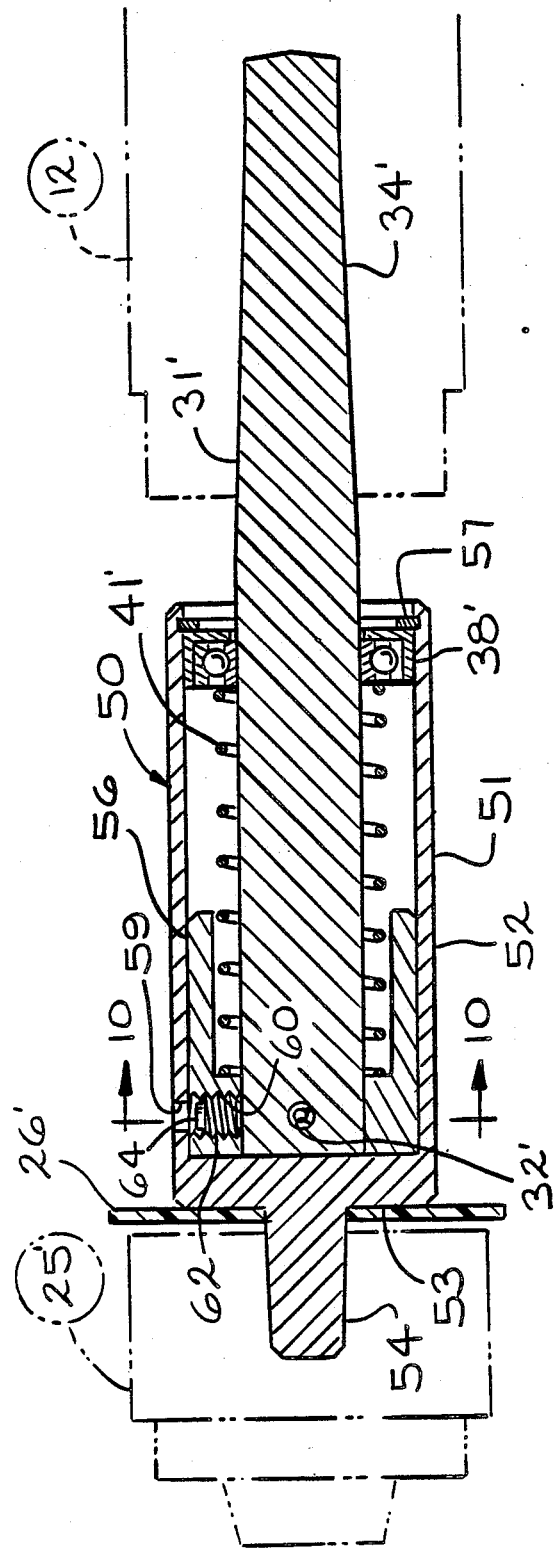
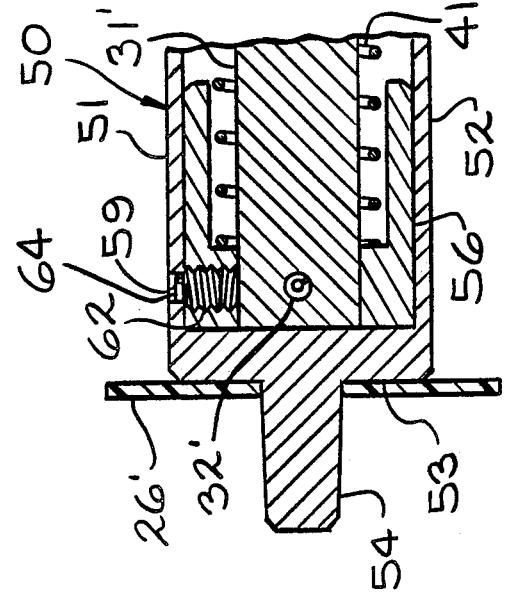
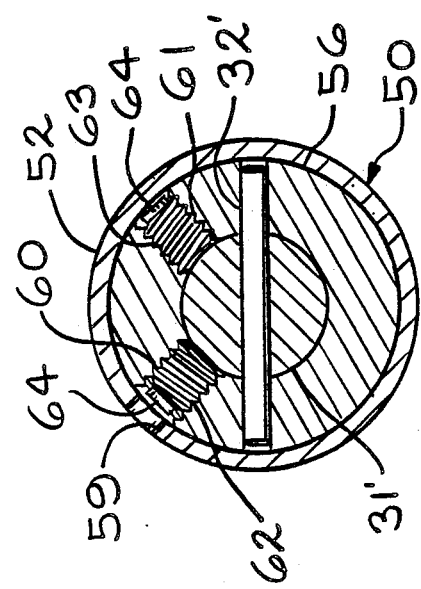

TAPPER/THREADER ASSEMBLY

BACKGROUND OF THE INVENTION

The present invention is directed to a tapper/threader assembly which may be used in connection with a standard lathe having a rotatable chuck and a tail stock positioned over the lathe bed. The assembly may also be used in a drill press, or milling machine.

A prior art combined drill, tap and lathe-center chuck adapter is shown in Norman et al. U.S. Pat. No. 2,714,318. In the Norman patent structure, there is no reciprocal movement between the parts. Therefore, in a Norman tapping operation, the lathe tail stock is being pulled. Because of the mass of the tail stock, it is possible to place too much tension on the threads which would tend to damage the threads.

SUMMARY OF THE PRESENT INVENTION

The present invention relates to a tapper/threader assembly which will perform all the usual lathe drilling type operations and in addition perform internal and external threading operations under power very quickly and safely.

The tapper/threader assembly may be used in a lathe, drill press or milling machine. The assembly has a piston member mounted for reciprocal movement within a sleeve housing. A shank member is connected to the piston member and has an outer end extending from the housing. A mounting shaft for mounting a chuck extends from the housing in an opposed relationship with the outer end of the shank member. A spring surrounds the piston member and biases the housing.

DESCRIPTION OF THE DRAWINGS

FIG. 1 is a partially diagrammatic view of a standard lathe having a tapper/threader assembly, according to the present invention, mounted in the lathe tail stock;

FIGS. 2–5 are diagrammatic views in sequential steps of a tapper/threader assembly, according to the present invention, being used to thread a rod workpiece;

FIG. 6 is a cross-sectional view of one embodiment of a tapper/threader assembly, according to the present invention;

FIG. 7 is a cross-sectional view taken along the line 7—7 of FIG. 6;

FIG. 8 is a cross-sectional view taken along the line 8—8 of FIG. 6;

FIG. 9 is a cross-sectional view of another embodiment of a tapper/threader assembly, according to the present invention;

FIG. 10 is a cross-sectional view taken along the line 10—10 of FIG. 9; and

FIG. 11 is a fragmentary cross-sectional view similar to FIG. 9 and showing the tapper/threader assembly in a locked position.

DESCRIPTION OF THE PREFERRED EMBODIMENTS

Referring to FIG. 1, a machine lathe is generally indicated by the reference number 10. The lathe 10 includes a headstock 11 and a tail stock 12. The lathe carriage has been omitted for clarity. The lathe 10 also includes a lathe bed 13. As shown in FIG. 1, a lathe chuck 14 is mounted on the headstock 11 and, in turn, mounts a threading die 15.

A tapper/threader assembly, according to the present invention, is generally indicated by the reference number 20.

Referring to FIGS. 6, 7 and 8, in the present embodiment, the tapper/threader assembly 20 includes a sleeve housing 21 consisting of a tubular member 22 and a connected end cap 23. The sleeve housing 21 is generally cupshaped and a mounting shaft 24 extends from the end cap 23 at one end. In the present embodiment, the mounting shaft 24 is tapered and mounts an assembly chuck 25, which is indicated by dashed lines in FIG. 6.

A ring-shaped guard member 26 is mounted on the shaft 24 adjacent the end cap 23. The guard member 26 is preferably made of an acrylic or polycarbonate material and includes an outer periphery 27 which extends outwardly of the sleeve housing 21.

Referring to FIG. 6, a cup-shaped piston member 30 is mounted for reciprocal sliding movement within the sleeve housing 21. A shank member 31 is connected to the piston member 30 by a roll pin 32, as best seen in FIG. 8. The shank member 31 includes a first end 33 and a second end 34. The second end 34 of the shank member 31 is tapered for reception in the tail stock 12, as shown in FIG. 1 and indicated by dashed lines in FIG. 6.

The first end 33 of the shank member 31 defines a key member 35. A keyway 37 is defined by the end cap 23 of the sleeve housing 21. As shown in FIG. 7, the keyway 37 extends completely across the shank member 31, in the present embodiment.

When the key 35 is received in the keyway 37, as shown in FIG. 6, the assembly 20 is locked and relative rotation is prevented between the piston member 30 and the sleeve housing 21. A bearing assembly 38 is mounted on the shank member 31 between the shank member 31 and the sleeve housing 21. The bearing assembly 38 can be either a ball bearing assembly, as shown, or in the alternative a thrust bearing. A lock ring 39 is mounted adjacent the bearing assembly 38. A spring 41 surrounds the shank member 31 and extends between the bearing assembly 38 and the interior of the cup-shaped piston member 30. As shown in FIG. 6, the spring 41 biases or urges the end cap 23 of the sleeve housing 21 toward the key 35 of the piston member 30.

Another embodiment of the present invention is shown in FIG. 9 where a tapper/threader assembly is generally indicated by the reference number 50. In this embodiment, the tapper/threader assembly 50 includes a one-piece, cup-shaped sleeve housing 51 having an integral tubular member 52 and an end cap 53. An integral tapered mounting shaft 54 extends outwardly from the end cap 53 and mounts a guard member 26' and an assembly chuck 25'. A cup-shaped piston member 56 is mounted for sliding reciprocal movement within the sleeve housing 51. A shank member 31' is connected to the piston member 56 by a roll pin 32'. The shank member 31' includes tapered end 34' which is received by the tail stock 12, indicated by dashed lines in FIG. 9. A bearing assembly 38' is mounted on the shank member 31' between the sleeve housing 51 and the shank member 31'. A lock ring 57 is mounted adjacent the bearing assembly 38'. A spring 41' surrounds the shank member 31' and extends between the interior of the cup-shaped piston member 56 and the bearing assembly 38'. The spring 41' urges the housing 51 to the right, as shown in FIG. 9.

The tapper/threader assembly 50 includes a different type of locking means for preventing relative rotation between the sleeve housing 51 and the piston member 56. At least one opening 59 is defined through the sleeve housing 51. In other embodiments (not shown) two or more openings 59 may be provided at ninety degrees circular intervals on the periphery of the tubular member 52.

Referring to FIG. 10, a pair of threaded openings 60 and 61 are provided in the piston member 56 and are in alignment with the opening 59 in the tubular member 52. The threaded openings 60 and 61 are 90 degrees apart, from one another, and receive set screws 62 and 63 having an engaging portion 64 at their outer ends.

To place the tapper/threader assembly 50 in its locked position, as shown in FIG. 11, one of the set screws 62 and 63 is aligned with the threaded opening 60 in the tubular member 52. The set screw, for example the set screw 62, is then rotated outwardly until the engaging portion 64 is positioned within the opening 59. This places the assembly 50 in its locked position. To unlock, the set screw 62 is rotated downwardly until the engaging portion 64 is below the level of the tubular member 52, as shown in FIG. 9.

Many different operations may be performed using the tapper/threader assemblies 20 and 50. While the present discussion has indicated the use of the tapper/threader assemblies 20 and 50 on a typical machine tool lathe, they may also be used on other machine tools, for example a drill press or milling machine.

Many operations may be performed using the tapper/threader assemblies 20 and 50. These include center drilling, standard drilling of a workpiece, the reaming of a hole, countersinking and the taping of a through hole. In addition, the assemblies 20 and 50 may be used in connection with tapping blind holes and, as indicated above, tapping holes on a drill press or milling machine.

For purposes of illustration, FIGS. 1-5 show a typical operation for cutting threads on a workpiece, in this case, on a rod. Referring to FIG. 1, the tapper/threader assembly 20 is mounted on the lathe 10 by inserting the shank member 31 in the lathe tail stock 12. A workpiece rod 70 is inserted in the assembly chuck 25. The operator next grasps a knurled outer side 71 of the sleeve housing 21 and moves the rod 70 along with the tail stock 21 toward the threading die 15 which is mounted in the lathe headstock 11. When the rod 70 is closely adjacent the threading die 15, the tail stock 12 is locked and the operator slides the sleeve housing 21 to the left. This causes sliding reciprocal motion between the sliding member 21 and the piston member 30 which moves the key member 35 away from the keyway 37 to the unlocked position. It should be noted that after initial setting, the lathe tail stock 12 is not pulled along with the assembly 20 during the threading operation. After the rod 70 engages the threading die 15, rotation of the lathe chuck 14 and the threding die 15 mounted therein automatically threads the rod (see FIG. 3). Referring to FIG. 4, the threading operation continues until the desired number of threads have been placed on the rod 70. At this time, the lathe chuck 14 is stopped and its motion reversed to remove the die 15 from the newly cut threads. As shown in FIG. 5, when the lathe is stopped, the operator grasps the sleeve housing 21, the lathe chuck 14 is reversed until the new threads clears the threading die 15. At that time the completed workpiece rod 70 with its newly cut threads may be removed.

It should be understood that throughout the operation, good machine tool practices should be maintained including the use of the proper cutting fluids and the use of proper safety equipment. The guard member 26 helps to ensure that the operator does not slide his hand past the guard member 26 during the cutting operation.

Many changes and revisions may be made in connection with the preferred embodiments of the invention described above without departing from the scope of the following claims.

What I claim:

1. A tapper/threader assembly for use in a lathe having a rotatable chuck and a tail stock, said tapper/threader assembly having a locked position and an unlocked position, said assembly comprising, in combination, a generally cup-shaped sleeve housing having a mounting shaft extending from one end, a piston member mounted for reciprocation within said sleeve housing, a shank member connected to said piston member having a tapered end extending outwardly from said sleeve housing, wherein said tapered end may be received by the lathe tail stock said housing being freely rotatable relative to said piston member when said assembly is in the unlocked position, spring means urging said housing toward said piston member, said spring means positioned within said sleeve housing in surrounding relationship with said shank member, locking means for selectively preventing relative rotation between said piston member and said sleeve housing, thereby selectively providing said locked and unlocked positions and a bearing assembly mounted on said shank member adjacent said housing.

2. A tapper/threader assembly, according to claim 1, including a chuck mounted on said mounting shaft.

3. A tapper/threader assembly, according to claim 1, wherein said locking means comprises at least one opening in said sleeve housing and a set screw mounted on said piston member, said set screw having a portion received by said opening when said assembly is in the locked position.

4. A tapper/threader assembly, according to claim 1, wherein said locking means comprises at least one opening in said sleeve housing and two set screws positioned ninety degrees apart on said piston member, each of said set screws having a portion to be received by said opening when said assembly is in the locked position.

5. A tapper/threader assembly, according to claim 1, wherein said locking means comprises a key member on said shank member, and a receiving keyway defined by said piston member for receiving said key member when said assembly is in the locked position.

6. A tapper/threader assembly, according to claim 1, and a guard member mounted on said mounting shaft adjacent said piston member, said guard member having an outer periphery extending outwardly of said sleeve housing.

7. A tapper/threader assembly, according to claim 1, and a circular guard member coaxially mounted on said munting shaft adjacent said piston member, said guard member having a periphery extending outwardly from said sleeve housing.

* * * * *